United States Patent [19]
Ilcisin et al.

[11] Patent Number: 6,064,153
[45] Date of Patent: May 16, 2000

[54] CHANNEL SUBASSEMBLY FOR A PLASMA ADDRESSED LIQUID CRYSTAL DISPLAY PANEL

[75] Inventors: Kevin J. Ilcisin; Thomas S. Buzak, both of Beaverton; Paul C. Martin, Sunriver, all of Oreg.

[73] Assignee: Tektronix, Inc., Beaverton, Oreg.

[21] Appl. No.: 08/925,689

[22] Filed: Sep. 9, 1997

Related U.S. Application Data

[60] Provisional application No. 60/028,199, Oct. 10, 1996.

[51] Int. Cl.⁷ ...................................................... H01J 17/49
[52] U.S. Cl. ............................ 313/582; 313/584; 313/587
[58] Field of Search ..................................... 313/582, 583, 313/584, 585, 587

[56] References Cited

U.S. PATENT DOCUMENTS 5,077,553  12/1991  Buzak ....................................... 340/794
5,717,292   2/1998  Jin et al. .................................. 313/582

*Primary Examiner*—Vip Patel
*Assistant Examiner*—Michael J. Smith
*Attorney, Agent, or Firm*—John D. Winkelman; John Smith-Hill

[57] ABSTRACT

A channel subassembly for a PALC display panel comprises a channel member having spaced, substantially parallel, linear channels in its upper surface and a cover sheet (6) attached to the channel member. Islands of transparent conductive material are disposed in a row on a surface of the cover sheet over each channel. The islands in each row are spaced apart along the channel over which they are disposed and are bounded in directions perpendicular to the length of the channel such that they do not extend laterally substantially beyond the channel.

6 Claims, 3 Drawing Sheets

CHANNEL SUBASSEMBLY FOR A PLASMA ADDRESSED LIQUID CRYSTAL DISPLAY PANEL

CROSS REFERENCED TO RELATED APPLICAITONS

This application claims the benefit of U.S. Provisional Application No. 60/028,199, filed Oct. 10, 1996.

BACKGROUND OF THE INVENITON

This invention relates to a channel subassembly for a plasma addressed liquid crystal (PALC) display panel.

U.S. Pat. No. 5,077,553 discloses apparatus for addressing data storage elements. A practical implementation of the apparatus shown in U.S. Pat. No. 5,077,553 is illustrated schematically in FIG. 3 of the accompanying drawings.

The display panel shown in FIG. 3 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 3), an upper substrate 14 carrying the data drive electrodes, and an upper polarizer 16. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the upper and lower polarizers 2 and 16. In the case of a color display panel, the panel elements include color filters (not shown) between the layer 10 and the upper substrate 14. The region of the upper surface of the display panel that bounds the panel element constitutes a single pixel 30 of the display panel.

It will be convenient in the following description to refer in general to a given data drive electrode $12_i$ and a given channel $20_j$ and to the panel element $28_{i,j}$ at which the data drive electrode $12_i$ and the channel $20_j$ cross.

The anodes in the several channels may be connected together by a rail (not shown) that is held at ground potential. When a suitable negative voltage is applied to the cathode in the channel $20_j$, the gas in that channel forms a plasma which provides a conductive strip at the lower surface of the cover sheet 6. The element of the data drive electrode $12_i$ and the area element of the conductive strip that is within the panel element $28_{i,j}$ form respective electrodes of a parallel plate capacitor; and the electrode at the lower surface of the cover sheet is held near ground potential by the plasma.

If the data drive electrode $12_i$ is at ground potential when the plasma is created in the channel $20_j$, the element capacitor in the panel element $28_{i,j}$ is not charged. There is no significant electric field in the volume element $10_{i,j}$ of electro-optic material and the panel element $28_{i,j}$ is considered to be off. However, if the data drive electrode $12_i$ is at a substantial positive potential when the plasma is created in the channel $20_j$, the element capacitor is charged and there is a substantial electric field in that volume element of electro-optic material and the panel element $28_{i,j}$ is considered to be on.

When the plasma in the channel $20_j$ is extinguished, the conductive strip is destroyed but on principles of conservation the lower surface of the cover sheet remains at a constant potential relative to the data drive electrode until a plasma is again created in the channel $20_j$ and the resulting conductive strip is connected to ground. Thus, the element $10_{i,j}$ of electro-optic material remains in the same state while there is no plasma in the channel $20_j$, even though the potential of the data drive electrode $12_i$ might not remain the same.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material that rotates the plane of polarization of linearly polarized light passing therethrough by an angle that is a function of the electric field in the liquid crystal material. When the panel element is off, the angle of rotation is 90°; and when the panel element is on, the angle of rotation is zero.

The panel is illuminated from the underside by an extended light source (not shown) that emits unpolarized white light. A rear glass diffuser 18 having a scattering surface may be provided between the light source and the panel in order to provide uniform illumination of the panel. The light from the source is linearly polarized at 0° by the lower polarizer 2 and passes sequentially through the channel member 4, the channels 20, the cover sheet 6, and a volume element of the liquid crystal material toward the upper polarizer 16 and a viewer 26. If a given panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity that depends on the electric field, allowing a gray scale to be displayed.

When the PALC display panel disclosed in U.S. Pat. No. 5,077,553 is used as a raster scan display panel for displaying an NTSC video signal, the panel is oriented so that the channels extend horizontally and the data drive electrodes extend vertically. The first active line of a frame of the video signal is sampled. A negative-going strobe pulse is applied to the cathode in the first channel to establish a plasma in the first channel, and the data drive electrodes are driven to voltage levels that depend on the respective sample values. In each panel element along the first channel, an electric field that establishes the state of the panel element is created between the data drive electrode and the conductive strip at the lower surface of the cover sheet. The strobe pulse is removed, and the plasma is extinguished, but the electric field persists, maintaining the state of the panel element until the first channel is again addressed, on the next frame of the video signal. This sequence of operations is repeated in order for the remaining active lines of the frame and the remaining channels of the display panel.

FIG. 4A illustrates schematically the situation during line j of a frame of the video signal, when there is a plasma in the channel $20_j$ and the three adjacent data drive electrodes $12_{i-1}$, $12_i$ and $12_{i+1}$ are all at the same positive voltage $V_+$.

The electric field vector is primarily perpendicular to the lower surface of the cover sheet throughout the volume element $10_{i,j}$ as shown by the electric field lines, and the electric field in the volume element $10_{i,j}$ is substantially uniform. The charge density over the lower surface of the cover sheet is substantially uniform within the panel element $28_{i,j}$. When the plasma in the channel $20_j$ is extinguished, the charge density over the area element of the lower surface of the cover sheet is frozen and the field in the volume element $10_{i,j}$ remains the same until line j of the next frame of the video signal.

FIG. 4B illustrates the same situation as FIG. 4A except that the data drive electrodes $12_{i-1}$ and $12_{i+1}$ are not at the same potential $V_+$ as the electrode $12_i$ but are instead at ground potential. In this case, it is desirable that the field in the volume element $10_{i,j}$ should be uniform and equal to the value in the case of FIG. 4A and that the electric field in the volume elements $10_{i-1}$ and $10_{i+1,j}$ should be uniform and equal to zero. However, this would not in fact be the case because there can be significant fringing fields between the electrode $12i$ and the electrodes $12_{i-1}$ and $12_{i+1}$, as indicated in FIG. 4B by the electric field lines linking the electrode $12_i$ with the electrodes $12_{i-1}$ and $12_{i+1}$. Consequently, the state of the data drive electrode $12_i$ is influenced by the state of the adjacent data drive electrodes, i.e. there is crosstalk between the data drive electrodes. As a result of the crosstalk, illumination of the pixels is non-uniform, and even if the non-uniformity in illumination of the pixels were tolerable, the contrast ratio would be impaired.

It is conventional to assemble a display panel of the kind shown in FIG. 3 by forming a channel subassembly, including the channel member and the cover sheet, forming an upper substrate assembly, including the upper substrate, the data drive electrodes and the layer of electro-optic material, and attaching the upper substrate assembly to the channel subassembly. In manufacture of the channel subassembly, the cover sheet is placed over the upper surface of the channel member and is sealed to the channel member around the periphery thereof.

SUMMARY OF THE INVENTION

In accordance with a first aspect of the present invention there is provided a channel subassembly for a PALC display panel, comprising a channel member having at least first and second linear channels formed in an upper surface thereof and extending in spaced, substantially parallel relationship, a cover sheet attached to the channel member, the cover sheet having a lower surface that confronts the upper surface of the channel member and also having an upper surface, and a row of discrete islands of transparent conductive material formed on at least one surface of the cover sheet over the first channel, said islands being spaced apart along said first channel and being bounded in directions perpendicular to the length of said first channel such that they do not extend laterally substantially beyond the first channel.

In accordance with a second aspect of the present invention there is provided a channel subassembly for a PALC display panel, comprising a channel member having a plurality of linear channels formed in an upper surface thereof and extending in spaced, substantially parallel relationship, a cover sheet attached to the channel member, the cover sheet having a lower surface that confronts the upper surface of the channel member and also having an upper surface, and a plurality of rows of discrete islands of transparent conductive material formed on at least one surface of the cover sheet, each row being disposed over one of the channels in the upper surface of the channel member and the islands in each row being spaced apart along said row and being bounded in directions perpendicular to the length of said row such that they do not extend laterally substantially beyond said one channel.

In accordance with a third aspect of the present invention there is provided a plasma addressed liquid crystal (PALC) display panel comprising an upper substrate, an array of data drive electrodes extending in spaced, substantially parallel relationship on a lower surface of the upper substrate, a layer of electro-optic material, and a channel subassembly comprising a channel member having at least first and second linear channels formed in an upper surface thereof and extending in spaced relationship, substantially perpendicular to the data drive electrodes, a cover sheet attached to the channel member, the cover sheet having a lower surface that confronts the upper surface of the channel member and also having an upper surface, and a row of discrete islands of transparent conductive material formed on at least one surface of the cover sheet over the first channel, said islands being bounded in directions perpendicular to the length of said first channel such that they do not extend laterally substantially beyond the first channel and being spaced apart along said first channel in accordance with the spacing of the data drive electrodes.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to denote corresponding elements.

Words of orientation and position, such as upper and lower, are used in the specification to establish orientation relative to the drawings are not intended to be limiting in a absolute sense.

DETAILED DESCRIPTION

Figure 1:
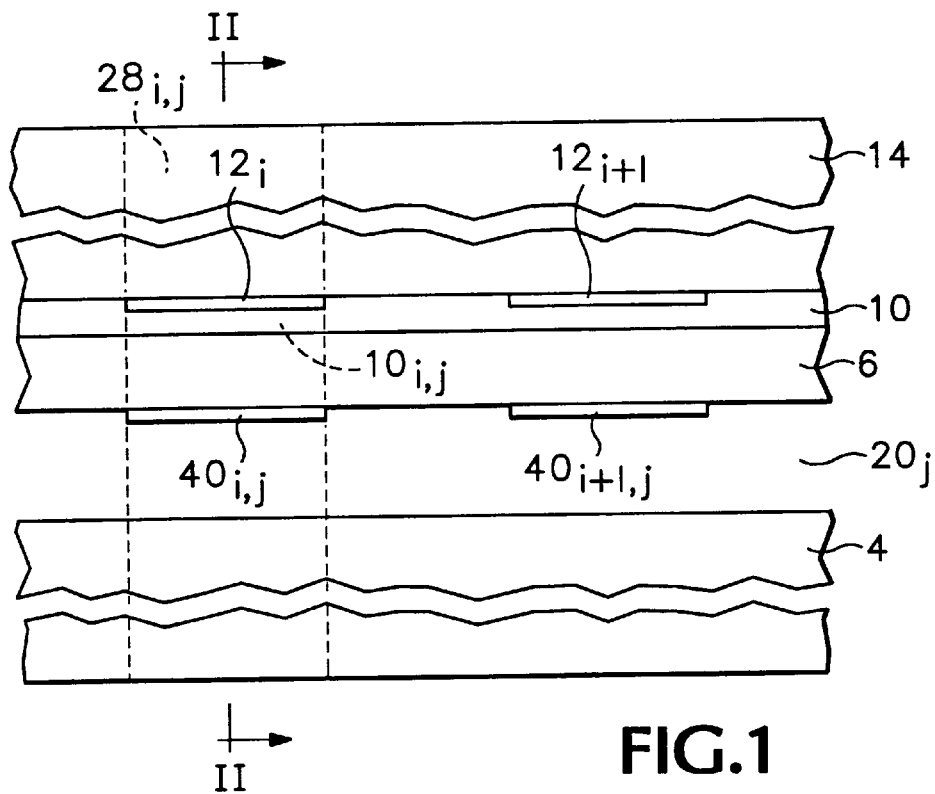
FIG. 1 is a partial sectional view of a PALC display panel in accordance with the present invention.
Figure 2:
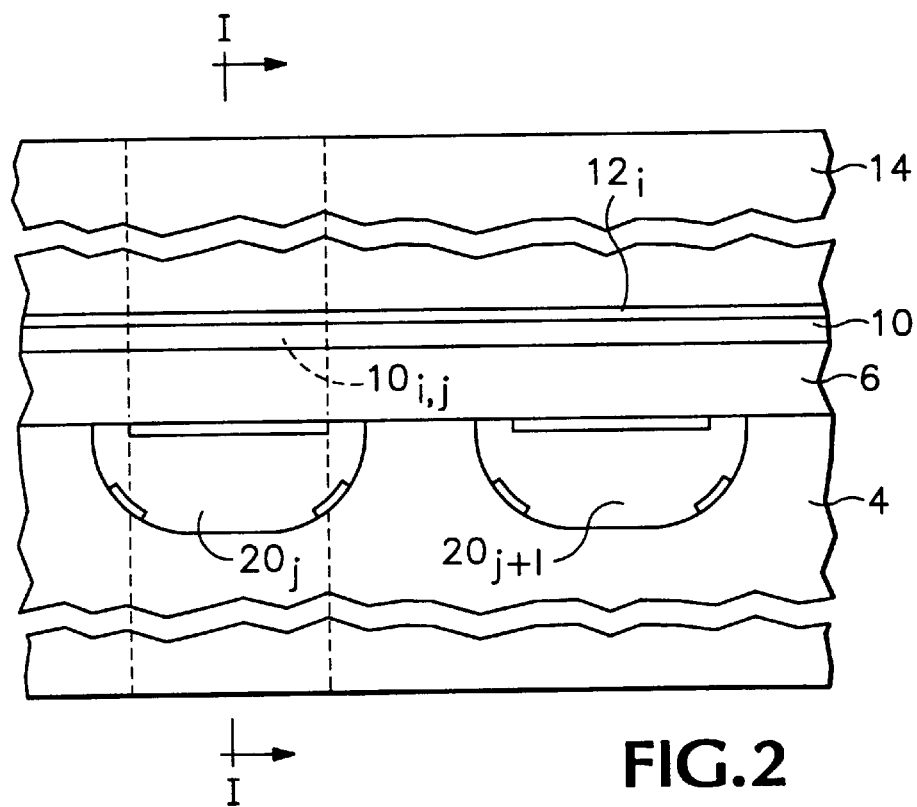
FIG. 2 is a sectional view taken on the line II—II of FIG. 1.
Figure 3:
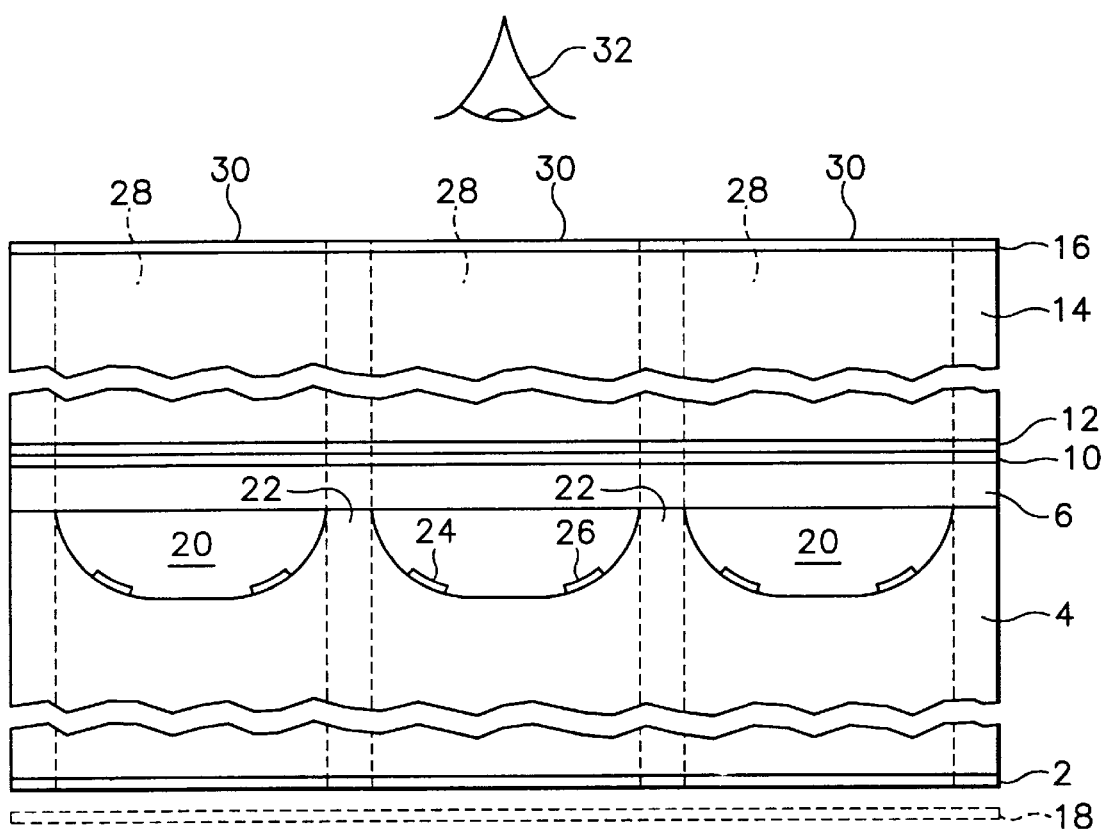
FIG. 3 illustrates schematically a sectional view of a PALC display panel in accordance with the prior art, viewed perpendicular to the channels in the channel member.
Figure 4A:
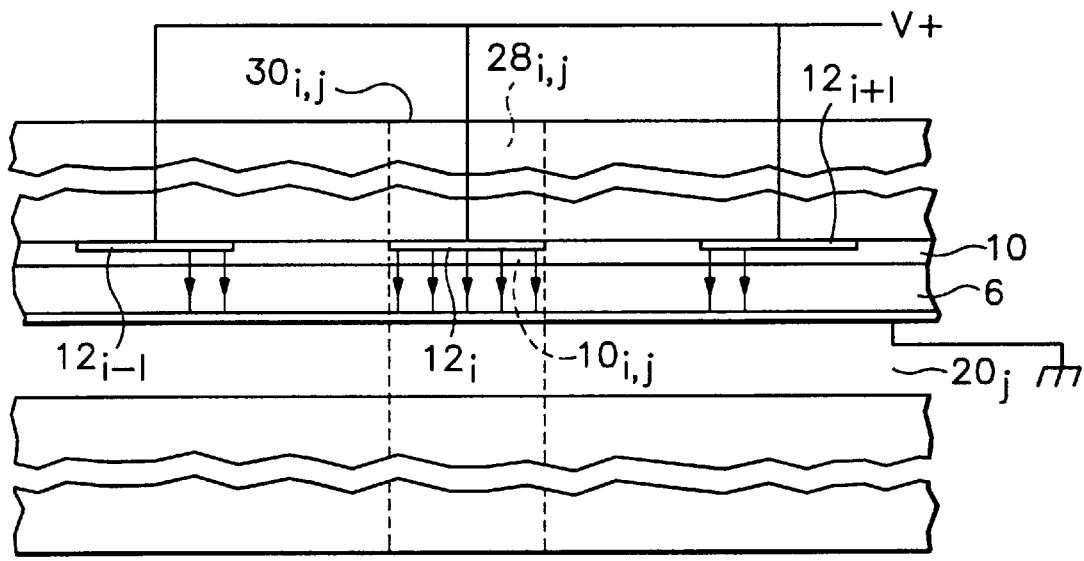
FIG. 4A is a sectional view taken perpendicular to the section illustrated in FIG. 3 in a first operating condition of the display panel.
Figure 4B:
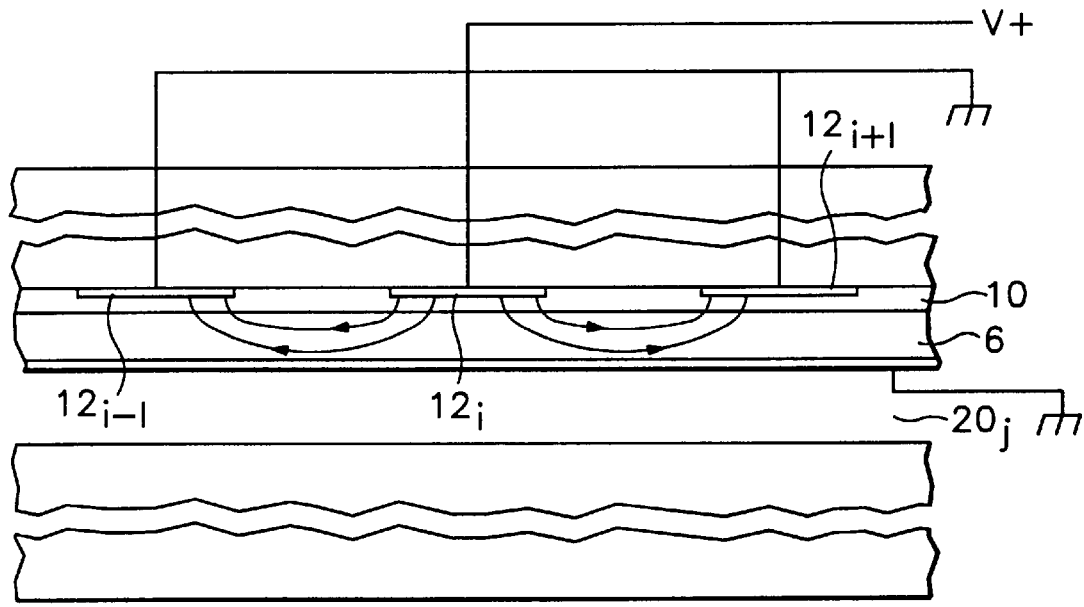
FIG. 4B is a similar view in a second operating condition of the display panel.

As shown in FIG. 1, each panel element 28 includes a discrete island 40 of transparent, electrically conductive material on the lower surface of the cover sheet. Since the island 40 is conductive, there can be no variation in charge density over the area of the island. Therefore, when the display panel is in use and a plasma is created in the channel $20_j$, the charge density over the lower surface of the cover sheet within the element $28_{i,j}$, is uniform and the electric field is uniform within the volume element $10_{i,j}$. The charge density over the lower surface of the cover sheet within the panel element $28_{i,j}$ remains uniform after the plasma is extinguished and its value does not change until the plasma is created in the channel $20_j$ on the next frame of the video signal. The fringing fields between the electrode $12_i$ and adjacent electrodes are reduced. Crosstalk between adjacent data drive electrodes is reduced. As a result, the pixels are illuminated uniformly and the contrast ratio is improved.

The islands may be formed on the lower surface of the cover sheet by sputtering a blanket layer of indium tin oxide (ITO) over the lower surface of the cover sheet and then selectively removing the ITO using conventional photolithographic techniques to leave a rectangular array of islands 40. The cover sheet is then positioned on top of the channel member and is attached thereto in conventional fashion to form the channel subassembly, and the channel subassembly is attached to the upper substrate assembly in conventional fashion.

Alternatively, the islands of transparent conductive material may be provided on the upper surface of the cover sheet, in which case the islands can be formed either before or after the cover sheet has been attached to the channel member. In the case of the islands being formed before the cover sheet has been attached to the channel member, the cover sheet is formed in the same way as previously described except that the blanket layer of ITO is sputtered over the upper surface of the cover sheet rather than the lower surface. In the other case, the cover sheet is attached to the channel member. The cover sheet may then be thinned, as described in Provisional Application No. 60/018,000 filed May 21, 1996. The blanket layer of ITO is sputtered onto the upper surface of the cover sheet and is then selectively removed using conventional photolithographic techniques to leave the desired rectangular array of islands.

It will be appreciated that the invention is not restricted to the particular embodiments that have been described, and that variations may be made therein without departing from the scope of the invention as defined in the appended claims and equivalents thereof.

What is claimed is:

1. A channel subassembly for a PALC display panel, comprising:
    a channel member having at least first and second linear channels formed in an upper surface thereof and extending in spaced, substantially parallel relationship,
    a cover sheet attached to the channel member, the cover sheet having a lower surface that confronts the upper surface of the channel member and also having an upper surface, and
    a row of discrete islands of transparent conductive material formed on at least one surface of the cover sheet over the first channel, said islands being spaced apart along said first channel and being bounded in directions perpendicular to the length of said first channel such that they do not extend laterally substantially beyond the first channel.

2. A channel subassembly according to claim 1, wherein the islands are formed on the lower surface of the cover sheet.

3. A channel subassembly for a PALC display panel, comprising:
    a channel member having a plurality of linear channels formed in an upper surface thereof and extending in spaced, substantially parallel relationship,
    a cover sheet attached to the channel member, the cover sheet having a lower surface that confronts the upper surface of the channel member and also having an upper surface, and
    a plurality of rows of discrete islands of transparent conductive material formed on at least one surface of the cover sheet, each row being disposed over one of the channels in the upper surface of the channel member and the islands in each row being spaced apart along said row and being bounded in directions perpendicular to the length of said row such that they do not extend laterally substantially beyond said one channel.

4. A channel subassembly according to claim 3, wherein the islands are formed on the lower surface of the cover sheet.

5. A plasma addressed liquid crystal (PALC) display panel comprising:
    an upper substrate,
    an array of data drive electrodes extending in spaced, substantially parallel relationship on a lower surface of the upper substrate,
    a layer of electro-optic material, and
    a channel subassembly comprising a channel member having at least first and second linear channels formed in an upper surface thereof and extending in spaced relationship, substantially perpendicular to the data drive electrodes, a cover sheet attached to the channel member, the cover sheet having a lower surface that confronts the upper surface of the channel member and also having an upper surface, and a row of discrete islands of transparent conductive material formed on at least one surface of the cover sheet over the first channel, said islands being bounded in directions perpendicular to the length of said first channel such that they do not extend laterally substantially beyond the first channel and being spaced apart along said first channel in accordance with the spacing of the data drive electrodes.

6. A PALC display panel according to claim 5, wherein the islands are formed on the lower surface of the cover sheet.

* * * * *